Patented Feb. 21, 1950

2,498,418

UNITED STATES PATENT OFFICE 2,498,418

PRODUCTION OF AZO DYESTUFF IMAGES FROM N-ACYL-N-ARYL HYDRAZINE DEVELOPERS

William E. Hanford, Short Hills, N. J., assignor to General Aniline & Film Corporation, New York, N. Y., a corporation of Delaware No Drawing. Application May 18, 1948,
Serial No. 27,818

15 Claims. (Cl. 95—88)

The present invention relates to color photography and more specifically to a process for producing azo dye images in photographic elements and to photographic elements containing novel color-forming components.

This application is a continuation-in-part of my copending application Serial No. 579,681, filed February 24, 1945, entitled "Production of azo dyestuff images from N-acyl-N-aryl hydrazine developers", now Patent No. 2,495,000, January 17, 1950.

One of the methods widely proposed for use at the present time for the production of photographic color images involves the so-called color-forming development method. By this procedure, quinonimine and azo methine dyestuffs are produced in situ with a silver image by reacting a color-forming component such as a phenol or a compound having a reactive methylene group with the oxidation products of a primary aromatic amino developer. Many of the dyes which are produced by these methods are not sufficiently light-fast to give images of good lasting properties. Other dyes are quite acid sensitive and fade or lose their color values when subjected to such acidic materials as may result from decomposition of the film base or as may be present in the atmosphere.

It is known that azo dyes are in general more stable towards light and acidic materials than the majority of the quinonimine or azo methine dyes which result from the color-forming development method. The azo dyes have in addition the advantage that it is possible when using the same to produce an unusually broad range of color images, thereby increasing the possibility of obtaining a true photographic reproduction of the color photographed. As a consequence, attempts have been made to process color film while producing the color images from azo dyestuffs.

These methods may be generally classified into two groups, (1) in which the azo dyes are employed to pre-dye the photographic emulsions, the dyes being subsequently destroyed at the places defined by the silver image, and (2) in which the azo dyestuff images are produced from colorless components during the processing of the film.

The first of these two methods is known as the silver dye bleaching method, and its method of application is illustrated in, for instance, U. S. P. 2,020,775. Many ramifications of the second method have been proposed in the prior art. One of these (see U. S. P. 1,758,572) involves the incorporation in the emulsion of insolubilized azo or coupling components and diazotizable amines. After exposure and development, the emulsion is subjected to the action of a bleaching bath which hardens the emulsion at the places defined by the silver image. Upon subsequently treating the emulsion with a diazotization bath, the bath operates only where the film has been unhardened to thereby effect diazotization and coupling of the components present in the emulsion.

Another method (see U. S. P. 1,963,197) takes advantage of the fact that diazonium compounds are capable of forming silver anti-diazotates. According to this procedure, a silver image is bleached and treated with an alkali antidiazotate to cause reaction between the bleached silver image and the antidiazotate to form the silver antidiazotate. The water-soluble alkali antidiazotate is then removed by washing. Upon subjecting the treated emulsion to the action of a coupling compound in the presence of an acid medium, the diazotate reacts therewith to produce a dyestuff image.

Still another method (see U. S. P. 2,312,875) involves the conversion of silver images into insoluble silver salt images which are in turn converted into insoluble zinc salt images. The latter are then used to produce zinc-diazonium double salts which are suitable for the production of azo dyestuffs upon coupling with an azo component.

A further method (see U. S. P. 2,333,126) proposes to incorporate in an emulsion a coupling component, to expose, develop and fix the emulsion and to then couple the coupling component with a diazonium compound in the presence of a heavy metal salt. Through the agency of the heavy metal salt, the dyestuff is formed in the areas free from the silver image.

All of these processes, a study reveals, have certain shortcomings which have militated against the adoption thereof by the art for practical purposes. The silver dye bleaching method, for instance, is unsuitable for use with taking film due to the fact that the pre-dyed emulsion layers act as filter layers, preventing proper exposure of the film. The other methods are usually time-consuming, difficult to operate, and are generally of theoretical rather than practical interest. They seldom give accurate reproduction of the original colors in the photographic subject, due to the many steps involved.

I have now found that azo dye images may be simply formed in photographic elements through the use with the non-quinone-forming phenolic coupling components of N-acyl-N-aryl hydrazines as color developers. By resort to this class of compounds as developers, a means is provided for overcoming many of the difficulties previously encountered in preparing the azo dye images. Inasmuch as the components are colorless when incorporated in the emulsion proper, they do not act as filter layers as in the silver dye bleach method. On the other hand, the process partakes of the simplification of the color-forming development method but gives in lieu of the azo methine and quinonimine dyes, the more durable azo dyes. With this process, colored photographic negatives, positives or prints comprising one or more layers can be obtained with a high degree of accuracy without encountering the problems inherent in the use of the known methods.

It is accordingly an object of the present invention to produce azo dyestuff images while using N-acyl-N-aryl hydrazines as color developers.

It is a further object of the present invention to produce azo dye images by subjecting an exposed emulsion to the action of a color developer comprising an N-acyl-N-aryl hydrazine and a coupling component.

It is a further object of this invention to produce azo dyestuff images from an emulsion containing a non-diffusing azo coupling component by subjecting the emulsion after exposure to development in an alkaline developer containing an N-acyl-N-aryl hydrazine.

It is a further object of the present invention to produce azo dyestuff positive images by the reversal method while using N-acyl-N-aryl hydrazines as the color developer.

It is a further object of this invention to produce azo dyestuff images by using an N-acyl-N-aryl hydrazine as both a color developer and as a coupling component.

It is a further object of this invention to produce azo dyestuff images in an emulsion containing as the color components an N-acyl-N-aryl hydrazine and a non-diffusing azo coupling component and developing the film by means of an alkaline solution.

A further object of this invention is a photographic emulsion containing an N-acyl-N-aryl hydrazine as a color-forming component.

A further object of this invention is a photographic emulsion containing a coupling component and an N-acyl-N-aryl hydrazine as a developing component.

Other and further important objects of this invention will be apparent as the description proceeds.

The basis on which the present invention is predicated is the discovery that when N-acyl-N-aryl hydrazines are subjected in an alkaline medium to the action of an oxidizing agent in the presence of a non-quinone-forming phenolic coupling agent, an azo dyestuff is produced. Thus it was discovered that when adding a small amount of 2-phenyl semicarbazide to a sodium carbonate solution of R-salt and incorporating in the solution a small amount of an oxidizing agent such as a few crystals of potassium periodate, a red dye is formed immediately to the surface of the crystals of the oxidizing agent.

Acting on this discovery, attempts were made to ascertain if an exposed silver halide could be substituted for the oxidizing agent and condition of the N-acyl-N-aryl hydrazine for coupling with the coupling component. It was found that the phenomenon previously mentioned was realized when treating an exposed silver halide with an N-acyl-N-aryl hydrazine in the presence of the aforesaid coupling components. The N-acyl-N-aryl hydrazine operates to convert the exposed silver halide to silver and is simultaneously conditioned for coupling with the coupling component.

It was further ascertained that this result was achieved irrespective of the nature of the latent silver image involved, that is, whether it was an original latent image, a reversed latent image, or a bleached silver halide image. In each case, the oxidizing effect produced when treating the latent image with the N-acyl-N-aryl hydrazine operated upon the hydrazine to make it suitable for coupling with a coupling component to produce an azo dye image in situ with a silver image.

The N-acyl-N-aryl hydrazines the use of which is contemplated by the present invention have the following structural formula:

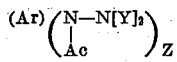

and these may be used as such or in the form of their salts, which have the following constitution:

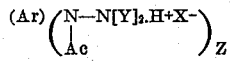

In these formulae, Ar is a mono- or polyvalent radical derived from a compound having an aromatic character, such as benzene, naphthalene, anthracene, phenanthrene, pyrazole, thiazole, pyrrole, furane, thiophene or the like, Ac is an acyl group or a group of similar character such as

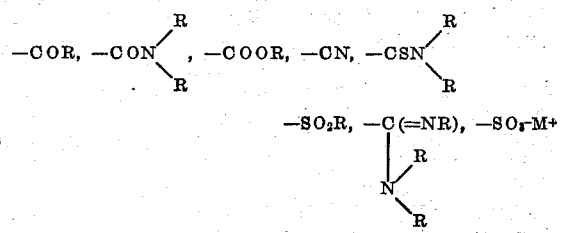

in which R is hydrogen, alkyl such as ethyl, methyl, propyl, butyl, amyl, octyl, decyl, stearyl and the like, aralkyl such as benzyl and the like, or a radical of aromatic character such as phenyl, toluyl, methoxy phenyl, naphthyl, diphenyl, anthryl, phenanthryl, pyrazolyl and the like, M is a metallic cation or a cation of an inorganic base, i. e., ammonium and the like or an organic base such as pyridinium, morpholinium and the like, Z is an integer from 1 to 3, and Y is hydrogen or a group which is readily removed by a modification of the pH of the solution such as $-CO.O^-M^+$ $-SO_3^-M^+$ and the like, M having the values heretofore referred to, and X represents an anion of an acid such as $-Cl^-$, $-SO_4^-$, $-HSO_4^-$, $-I^-$ and the like. The compounds of the above formula in any case are easily converted to the N-acyl-N-aryl hydrazine structure corresponding to the following formula merely by changing the pH of the solution involved:

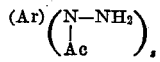

Examples of the N-acyl-N-aryl hydrazines which fall within the above category and which I have found to be effective for my purpose are: 2-phenyl semicarbazide of the formula

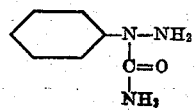

bis-2.2'-(4.4'-diphenylene)-semicarbazide of the formula

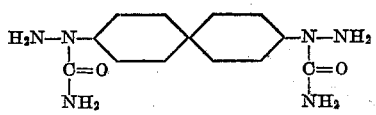

4-β-naphthyl-2-phenyl semicarbazide of the formula

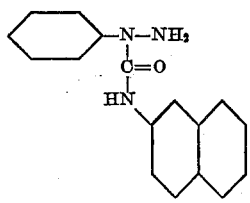

N-benzoyl-N-(3-chlorophenyl)-hydrazine sulfate of the formula

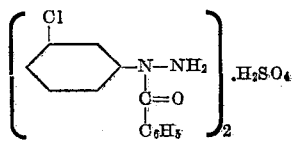

N-phenyl-N-stearoyl hydrazine sulfate of the formula

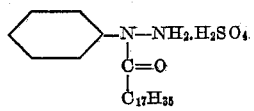

sodium N-phenyl-N-stearoyl-N'-carboxylate of the formula

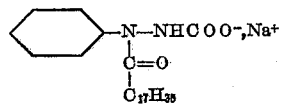

2-β-naphthylsemicarbazide of the formula

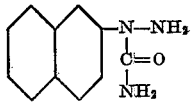

2-(4-acetamidophenyl)-semicarbazide of the formula

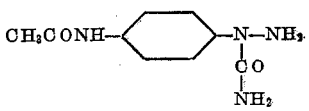

2-(4-nitrophenyl)-semicarbazide of the formula

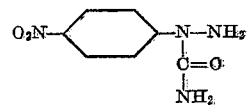

2-(4-bromophenyl)-semicarbazide of the formula

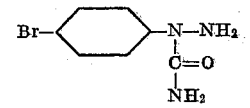

2-p-tolyl semicarbazide of the formula

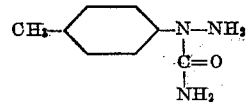

N-acetyl-N-phenyl hydrazine of the formula

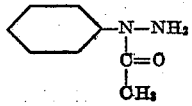

2-(4-diethylaminophenyl)-semicarbazide of the formula

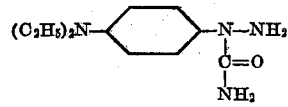

2-(4-methoxyphenyl)-semicarbazide of the formula

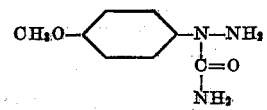

2-[4-(3-keto-5-methyl-1-phenylpyrazolyl)]-semicarbazide of the formula

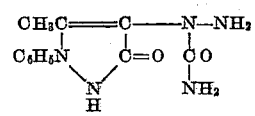

2-(1-anthryl)-semicarbazide of the formula

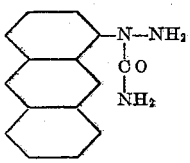

2-(2-phenanthryl)-semicarbazide of the formula

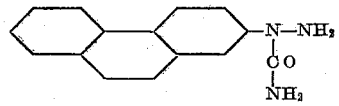

2-(2-benzo-thiazolyl)-semicarbazide of the formula

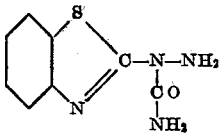

2-[2-(5-carbethoxyfuryl)]-semicarbazide of the formula

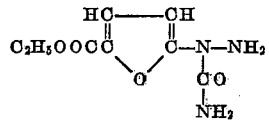

2-[4-(3-carbethoxy-2-methylthienyl)]-semicarbazide of the formula

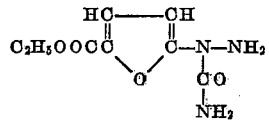

N-phenyl-N-carbomethoxy hydrazine of the formula

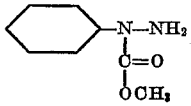

N-phenyl-N-cyano-hydrazine of the formula

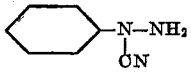

2-phenyl-thiosemicarbazide of the formula

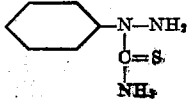

N-phenyl-N-methyl-sulfonyl hydrazine of the formula

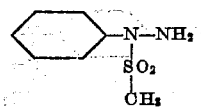

sodium N-phenyl-N-hydrazine sulfonate of the formula

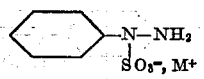

N-amino-N-phenylguanidine of the formula

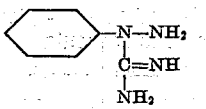

As illustrative of the manner in which certain N-acyl-N-aryl hydrazines may be prepared may be mentioned the reaction of an aryl hydrazine with phthalic anhydride (for the purpose of blocking the β-nitrogen atom) followed by substitution of the remaining α-hydrogen atom in the resulting anilino compound by the desired acyl substituent and then splitting off the phthalyl group to obtain the desired final product. For instance, if the product desired is N-benzoyl-N-phenyl hydrazine, phenyl hydrazine is fused with phthalic anhydride at a temperature of 140 to 150° to produce N-anilino-phthalimide according to the following equation:

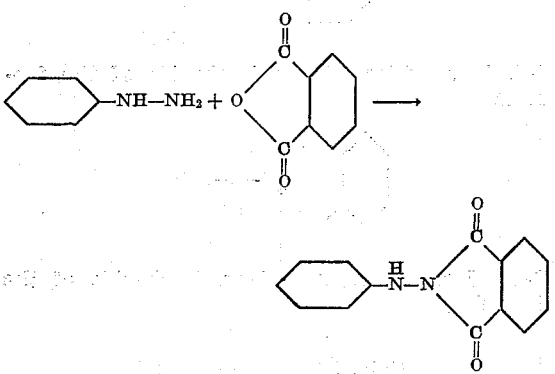

After the isomeric N-phenylphthalhydrazide which is also formed has been removed, the N-anilino-phthalimide is then acylated with benzoyl chloride by heating in the presence of sodium hydroxide to produce the N-benzoyl derivative according to the following equation:

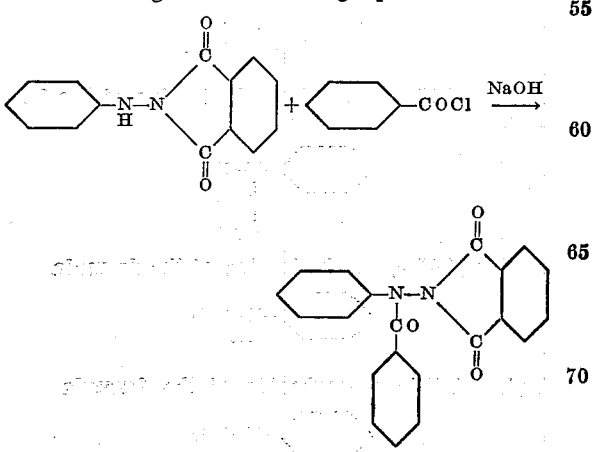

The phthalyl group is then split off by treating the acylated phthalimide with hydrazine and then with hydrogen chloride, the reaction taking place as follows:

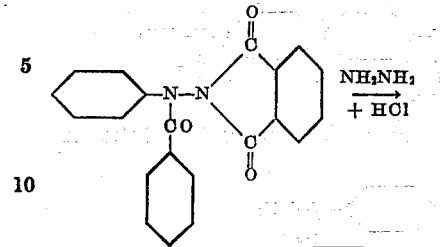

This reaction will of course be varied depending upon the particular acyl group which is desired in the N-acyl-N-aryl hydrazine, or depending upon the particular aryl group which should be present therein. If, for instance, the aryl group is naphthyl, then the original reaction will be carried out with a naphthyl hydrazine instead of phenyl hydrazine. On the other hand, if an α-carbamyl (or substituted carbamyl) aryl hydrazine is desired, such as

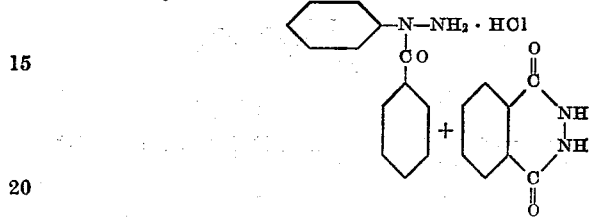

then the N-anilinophthalimide described above may be treated with isocyanic acid or an ester thereof such as an alkyl, aralkyl, or aryl isocyanate followed by removal of the phthalyl group from the β-nitrogen atom of the hyrazine, thus:

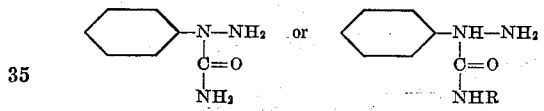

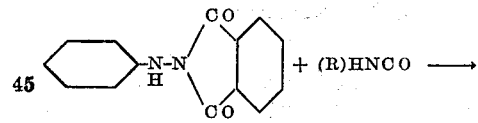

In such cases, however, it is not always necessary to employ the phthalyl group for blocking the β-nitrogen of the aryl hydrazine; aryl hydrazones derived from common aldehydes and ketones have in many cases proved to be useful starting materials. For example, acetone phenylhydrazone may be treated with isocyanic acid or an ester thereof followed by removal of the isopropylidene group as acetone to give a 2- or 2,4-substituted semicarbazide, thus:

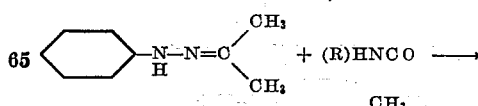

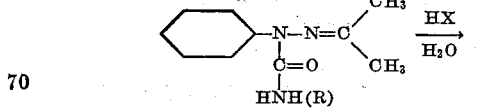

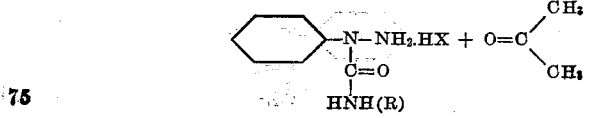

Where thiosemicarbazides are desired, isothiocyanic acid or esters thereof may replace isocyanic acid or its esters. It should be mentioned that where the thiocarbamyl derivatives are sought it is not so important that the β-nitrogen be well blocked, i. e., many 2- or 2.4-substituted thiosemicarbazides may be prepared directly from an aryl hydrazine and isothiocyanic acid or an ester thereof. For example, 2.4-diphenylthiosemicarbazide may be prepared by reacting phenyl hydrazine with phenyl isothiocyanate, thus:

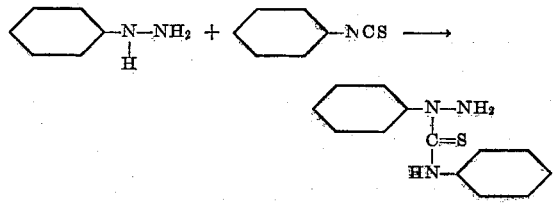

In cases where α-sulfonyl derivatives are desired, N-anilino phthalimides may be treated with an alkyl or aryl sulfonyl chloride, followed by removal of the β-phthalyl group.

N-aryl-N-aminoguanidines may be prepared by adding cyanamide to an aryl hydrazine, thus:

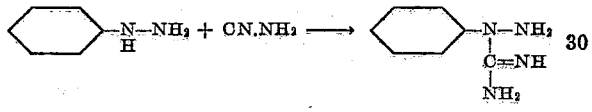

In cases where an α-cyano aryl hydrazine is desired, a cyanogen halide may be used with an aryl hydrazine having a well-blocked β-nitrogen, followed by removal of the unwanted group, thus:

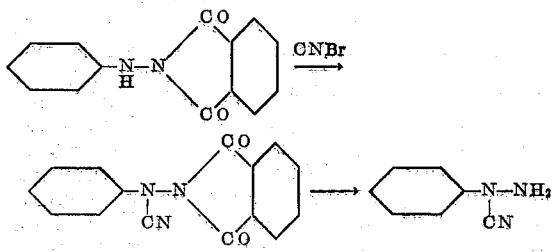

β-blocked aryl hydrazines may be sulfonated in the α-position by fusion with a metallic bisulfate and by other well-known means.

The coupling components which are utilized for producing the azo dyes by reaction with the N-acyl-N-aryl hydrazines after oxidation thereof during development are phenols which per se have a lower reduction potential than said hydrazines. It is recognized that many phenols are strong reducing agents for exposed silver halides and are commercially used as photographic developing agents. The most effective of such compounds for this purpose are those containing hydroxyl or hydroxyl and amino groups in the 1.2 and 1.4 positions (or positions corresponding to the 1.4, such as the 2.6 positions in a naphthalene ring), and which are accordingly capable of forming quinones. These compounds cannot be utilized in my process for they, and not the N-acyl-N-aryl hydrazines would act as the developers, and any dyestuff formation ensuing as a consequence thereof would involve a coupling of the quinones formed from such developers with the N-acyl-N-aryl hydrazines.

As a matter of fact such process is described by Schinzel in U. S. P. 2,276,254 wherein 1.2- or 1.4-dihydroxy naphthalenes are used to develop a latent image and the quinone resulting from such reaction is coupled, inter alia, with a hydrazide to yield, eventually, an azo dyestuff image. The reactions which occur in this method while using 1.2-dihydroxy-naphthalene-4-sulfonic acid as the developer and asymmetrical benzoyl phenyl hydrazine as the coupler may be represented as follows:

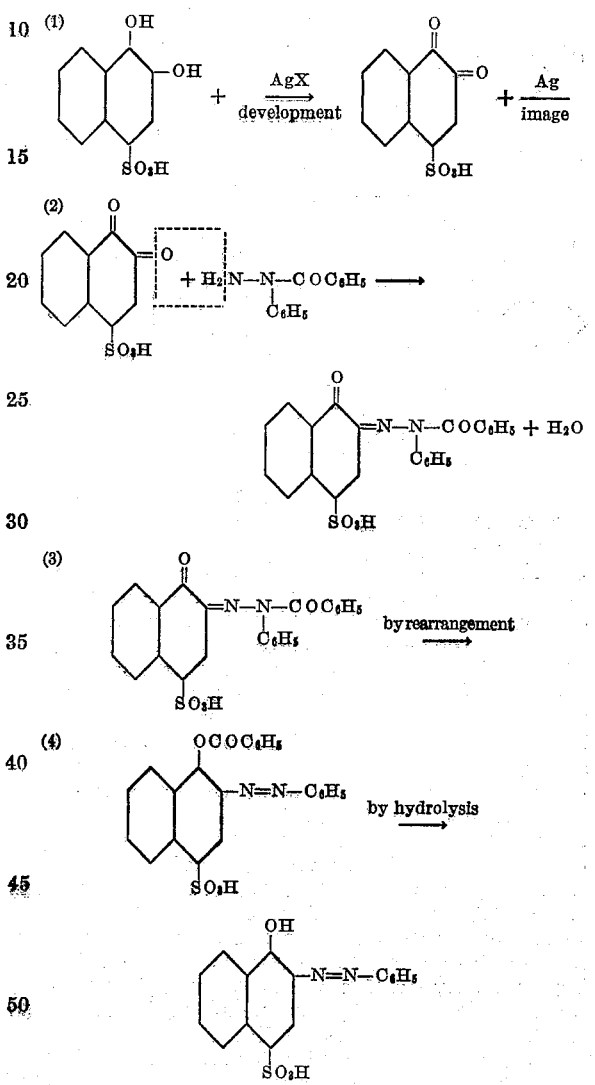

It is evident that in this process one hydroxyl group is always eliminated from the naphthol developer during formation of the dyestuff image. It is equally manifest that this process is of very limited application since by it one is only able to form azo dyes in which one nitrogen atom of the azo linkage is connected to a hydroxy- or aminonaphthalene group in ortho- or para-position to the hydroxyl or amino group.

The phenols which I utilize as coupling components are those which are incapable of quinone formation and which will hereinafter be referred to as "non-quinone-forming phenols." Examples of such phenols which I have found to be suitable are: phenol itself, resorcinol, salicylic acid, 4-amino-2-hydroxy toluene, β-naphthol, G-salt, H-acid, K-acid, J-acid, gamma acid, chromotropic acid, S-acid, 1-hydroxy-3.6-disulfonic acid, R-salt, and the like.

The reactions involved in the production of the azo dye images according to my invention are illustrated by the following equations wherein the developer is asymmetrical benzoyl phenyl hydrazine and the coupler is chromotropic acid:

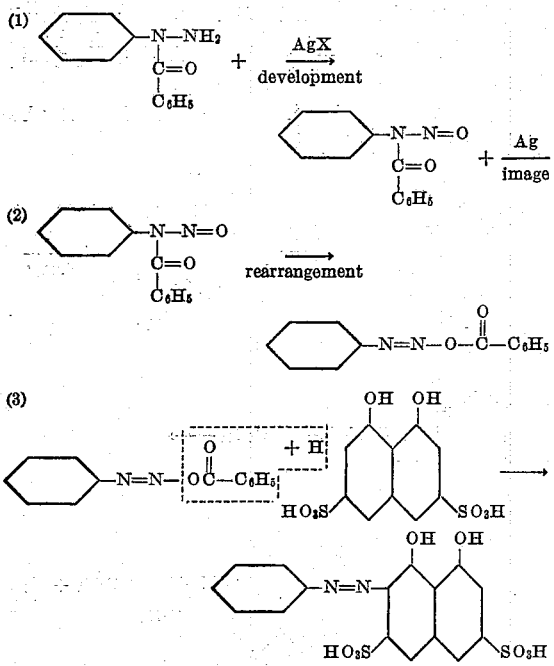

It is believed that a comparison of these reactions with those given above will serve to clearly differentiate the procedure according to my invention from that of Schinzel. In the first instance, it will be noted that when using the hydrazine as the developer, the azo dyes are formed without the elimination of a hydroxyl group from the naphthalene ring system of the coupler. In the second place it will be observed that the hydrazine upon development is by oxidation and subsequent rearrangement converted into a compound which acts in the same fashion as a diazonium salt. Finally it will be appreciated that the process is of much more general application than is that of Schinzel since it permits the utilization of any phenol so long as the same is not capable of forming a quinone. A much greater variety of azo dyes can accordingly be produced by resort to my procedure than is capable of being formed by the Schinzel procedure. The versatility of my procedure as compared to Schinzel's accordingly speaks for itself.

The effect of the N-acyl-N-aryl hydrazines may be realized in different ways. In one, the coupling component in soluble form is added to the N-acyl-N-aryl hydrazine developing solution. In another modification, the coupling component rendered fast to diffusion may be incorporated in the emulsion. In still another modification, both the coupling component and the N-acyl-N-aryl hydrazine rendered fast to diffusion may be incorporated in the emulsion. In the latter case, the active $NH_2$ group of the N-acyl-N-aryl hydrazine is blocked by converting it prior to incorporation in the emulsion, into a group such as $-NHCOO^-M^+$, $-NHCOOR$, $-NHSO_3^-M^+$, or $-NH_3 \cdot HX$, wherein R, M and X have the values previously given. These groups prior to coupling to form the azo dyes are reconverted to the active $NH_2$ group by subjecting the emulsion to an aqueous solution and adjusting the pH by the addition of an acid or alkali. For instance, when the amino group is blocked by an acid salt group, an alkali is employed, whereas when a carbamic salt is employed, a controlled amount of acid is used to produce the free $-NH_2$ group.

The coupling component and the N-acyl-N-aryl hydrazine may be rendered fast to diffusion by the methods disclosed in U. S. P. 2,179,228, 2,178,612, 2,179,224, 2,186,045, 2,186,719, 2,186,732, 2,186,849, and 2,186,734. The preferred method, however, is to include in the compounds a long alkyl chain such as the dodecyl radical, a stearyl radical or the like. An example of a coupling compound which has been rendered fast to diffusion by this method is N-stearoyl-H-salt. The N-acyl-N-aryl hydrazines referred to above which contain a stearyl radical are illustrative of such compounds which have the property of being fast to diffusion in gelatin.

Certain of the N-acyl-N-aryl hydrazines may be utilized not only as the developing agent but as the coupling agent as well. The compounds which possess these characteristics are the compounds in the above formula wherein Ac is $-CONHR$ and COOR in which R is a radical of a naphthalene compound capable of coupling to produce an azo dye. Examples of such compounds are 4-β-naphthyl-2-phenyl semicarbazide, 4-(5-hydroxy-1-naphthyl)-2-phenylsemicarbazide, and the like. Apparently these compounds under the influence of the exposed silver halide and the alkaline medium are oxidized and rearranged to form compounds which split to give a diazo compound and a coupling compound. For instance, in the case of the 4-β-naphthyl-2-phenyl-semicarbazide, it appears that this compound rearranges to a diazo ester of the formula $C_6H_5N=NOOCNHC_{10}H_7$. This ester thereupon splits, giving a diazo compound which is capable of coupling with the naphthylamine portion of the original molecule.

Various methods are available for processing color film while utilizing the N-acyl-N-aryl hydrazines of the present invention. One such method involves exposing a photographic element, developing it to black-and-white with an ordinary developer such as metol-hydroquinone, washing, reversing by exposing the residual silver halide to light, and treating the photographic element with an alkaline developer containing the N-acyl-N-aryl hydrazine and an azo coupling component of the type hereinabove referred to. After bleaching and fixing in the usual manner, there is obtained a positive dye image of the azo dyestuff resulting from the combination of the hydrazino compound with the coupling component.

Another method which may be utilized involves incorporating in a photographic element a coupling component which is fast to diffusion in gelatin, for instance, a naphthol containing a long alkyl chain. The emulsion is then exposed and developed in the usual manner. The residual silver halide is subsequently exposed and the emulsion treated with an alkaline developer containing an N-acyl-N-aryl hydrazine. After washing, bleaching and fixing, a positive azo dye image is formed in the emulsion.

A further method involves the inclusion in the silver halide emulsion of both the N-acyl-N-aryl hydrazine and a non-diffusing azo coupling component, of the type hereinbefore mentioned. After exposure, the emulsion is developed by placing it in an alkaline solution. After development, the emulsion is washed, the reduced silver is bleached, and the silver salts are fixed. As the result of this process, a negative azo dye image is formed in the emulsion.

Still another modification is one in which the N-acyl-N-aryl hydrazines may be located in the emulsion and the azo dyestuff coupling components in the alkaline developer. By proceeding as above, a negative azo dyestuff is also produced in the emulsion.

A further embodiment involves the use of the N-acyl-N-aryl hydrazines which operate both as diazo compounds and as couplers. A gelatino-silver halide emulsion maintained at a pH on the acid side has incorporated therein, for instance, 4-β-naphthyl-2-phenyl semicarbazide sulfate. Upon exposing the emulsion and developing it in an alkaline bath, bleaching and fixing, a negative dyestuff image is obtained in the emulsion. As an alternative of this method, the hydrazine may be located in the developing bath, in which case it may be utilized to develop either a negative latent or a positive latent silver image.

It is to be understood that the invention is not limited to the use of only a single silver halide emulsion. Thus films or plates carrying several emulsion layers may be used as well as the single layer elements. The layers may or may not all be on the same side of the film base. In addition, the so-called bi- and tri-pack photographic elements may be used. The invention may likewise be employed for the production of colored prints as well as for the production of transparencies.

The invention is further explained by the accompanying examples, although it is to be borne in mind that the examples are illustrative and not limitative. The parts are by weight unless otherwise stated.

*Example I*

A photographic film carrying a gelatino-silver bromide emulsion is exposed in a camera and developed to black and white in a 3,4-diaminophenol developer. The film is then thoroughly washed, exposed to light, and placed in a color-developing solution containing 45 parts of water, 2.5 parts of sodium carbonate, 1 part of R-salt (sodium salt of 2-hydroxynaphthalene-3.6-disulfonic acid), and 1.5 parts of 2-phenylsemicarbazide [$C_6H_5N(CONH_2)NH_2$]. The temperature is not allowed to go above 20° C. This color development process is allowed to proceed for 20–30 minutes. After this, the film is thoroughly washed and placed in a silver bleaching bath containing potassium ferricyanide, where it is kept until all the silver of the film is converted into silver salts. The silver salts are then removed by treatment with a thiosulfate fixing bath. After washing, the film contains a bright red dye image which presumably has the following structure:

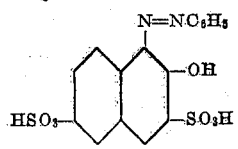

*Example II*

A gelatino-silver bromide emulsion was prepared which contained 3% by weight of 5-stearamidonaphthol-1. This was coated onto a suitable support and exposed in a camera. The exposed element is developed in a p-methylaminophenol-hydroquinone developer, washed, and then given a general exposure to light. For the color development step, a bath consisting of water 92 parts, 2-phenylsemicarbazide

[$C_6H_5N(CONH_2)NH_2$]

3 parts and sodium carbonate 5 parts is used. The development is allowed to proceed for 20 minutes during which time the temperature is not allowed to rise above 18° C. When the development is completed, the element is bleached and fixed. After washing and drying, the film is found to contain a magenta dyestuff image. This dye has the following probable structure:

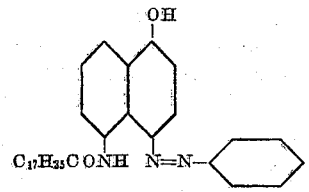

*Example III*

A gelatino-silver halide emulsion is prepared which contains 4% by weight of N-stearoyl-H-salt (disodium 8-stearamido-1-naphthol-3.6-disulfonic acid). This preparation is spread on a suitable base and the resulting light-sensitive element is exposed in a camera and is developed for 25 minutes at 18° C. in 100 parts of an aqueous bath containing

5 parts, and sodium carbonate 7 parts. After this development, the element is washed, bleached and fixed, leaving a clear blue-colored negative dye image.

*Example IV*

A light-sensitive silver-bromide-gelatin emulsion element is exposed and developed in a p-methylaminophenol-hydroquinone type developer. After washing, the element is given a general exposure to light and subjected to a second development in a bath which contains water 93 parts, sodium carbonate 5 parts, and 4-β-naphthyl-2-phenyl-semicarbazide

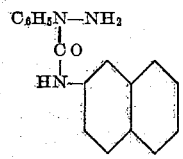

2 parts. This second or "color" development is allowed to proceed for ½ hour, care being taken to keep the temperature below 20° C. After washing, bleaching and fixing as in Example I, the element is found to contain a brownish-yellow positive azo dye image having the following probable structure:

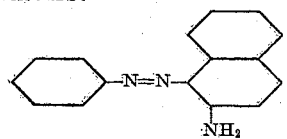

*Example V*

A gelatino-silver halide emulsion is prepared which contains 3% by weight of 4-β-naphthyl-2-phenylsemicarbazide sulfate

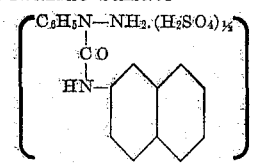

This emulsion is coated onto a suitable support and the light-sensitive element prepared in this way is exposed in a camera. Upon placing this element in a bath consisting of sodium carbonate 10 parts and water 90 parts, development is effected. The element is then thoroughly washed, bleached, fixed, and washed again, care being taken to prevent the temperature from rising above 18° C. The element treated in this way contains a brownish-yellow negative azo dye image whose chemical structure is probably the same as that indicated in Example IV.

*Example VI*

A gelatino-silver halide emulsion (having a pH of 5) is prepared containing 3% by weight of N-benzoyl-N'(3-chlorophenyl)-hydrazine sulfate

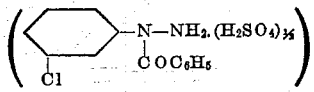

and 4% by weight of 2-hydroxy-3-naphthoic acid anilide

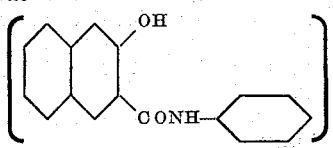

This emulsion is spread on a suitable support and exposed in a camera. The element is then developed by placing it in a 10% sodium carbonate solution. After thoroughly washing, bleaching and fixing and finally washing thoroughly again, the element is found to contain an orange negative azo dye image. The probable structure of the dye is as follows:

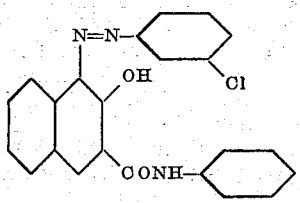

*Example VII*

A gelatino-silver halide emulsion containing 3% by weight of N-phenyl-N-stearoylhydrazine sulfate $[C_6H_5N(COC_{17}H_{35})NH_2.(H_2SO_{4 1/2})]$ is coated onto a suitable support and the light-sensitive element thus produced is exposed in a camera. Development is then effected by placing this element in a bath consisting of water 90 parts, sodium carbonate 7 parts and R-salt 3 parts, for 30 minutes at a temperature not exceeding 18° C. The element is then thoroughly washed, the reduced silver is bleached to a silver salt, and the silver salts present are fixed out with a thiosulfate bath. After washing, there remains a clear red negative azo dye image. This dye has the same probable structure as that indicated for the dye image in Example I.

*Example VIII*

A gelatino-silver halide emulsion is adjusted to a pH value of 7.8 by addition of sodium acetate and 3% by weight of sodium N-phenyl-N-stearoyl-N'-carboxylate $[C_6H_5N(COC_{17}H_{35})NHCOONa]$ is added. This light-sensitive mixture is spread on a suitable supporting material, exposed in a camera and developed in an alkaline developing bath containing p-methylaminophenol-hydroquinone. After thoroughly washing, the element is given a general exposure to light. The hydrazine developer present in the emulsion is then activated by bathing the element in an acidic bath. After washing the element, it is developed by bathing it in a bath containing water 90 parts, sodium carbonate 5 parts, and R-salt 5 parts, 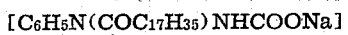 for 30 minutes at not more than 18° C. After bleaching, fixing, and washing, the element is found to carry a clear red positive azo dye image. The dye has the same probable structure as that indicated for the dye image produced by the method of Example I.

*Example IX*

The positive silver image in a photographic film is bleached to a silver ferrocyanide image by bathing in a bath containing a ferricyanide. After washing, the silver salt image thus formed is converted into a dye image by bathing the film in a bath consisting of water 90 parts, sodium carbonate 5 parts, 2-phenyl-semicarbazide $[C_6H_5N(CONH_2)NH_2]$ 3 parts, and sodium β-napthtolate 2 parts. At the end of 30 minutes, the dye image is formed and the reduced silver and residual salts may be recovered by again bleaching the film in a ferrocyanide and then fixing and washing. The dye in the dye image, which is a reddish-brown, has the following probable structure:

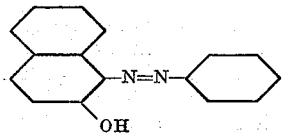

*Example X*

The positive silver image in a photographic film is converted by bathing the film in a solution containing mercuric chloride. After the film is washed, the inorganic salt image is replaced by bathing the film in a bath containing sodium β-naphtholate and 2-phenylsemicarbazide as in Example IX. The metallic mercury and silver and their salts are removed from the film by means of a cyanide-ferricyanide bleach. There remains in this case, a reddish-brown dye image similar to that produced in Example IX.

I am cognizant of U. S. P. 2,339,213 which discloses and claims the use of aromatic hydrazines in connection with suitable coupling agents for the production of dyestuff images in silver halide emulsions. I have found, however, that by comparison, such aromatic hydrazines are inferior to the N-acyl-N-arylhydrazines of the present invention. Aromatic hydrazines of the type $ArNHNH_2$ (where Ar is an aryl radical) were used by Jacobson as early as 1885 as photographic developers (see German Patent 34,342). However, because of their poor developing properties, these compounds never came into practical use. In this connection it is pertinent to note the statement by Mees in his book entitled The Theory of the Photographic Process (1942), page 339, to the effect that no developing agent of outstanding importance has been found among these compounds (meaning by "these compounds" the aromatic hydrazines). Such aromatic hydrazines are in many cases harmful to gelatin emulsions, as is evidenced by the necessary of using low temperatures for development and, further, are not sufficiently strong developing agents to develop original latent images as contrasted to bleached images.

The N-acyl-N-aryl hydrazines contemplated herein, however, do not affect gelatin emulsions at ordinary temperatures, i. e., temperatures of around 20° C. In addition, it is not necessary to employ surface-active, dispersing agents or oxidizing agents to assure a satisfactory developing action. They are, moreover, capable of developing original latent images as well as bleached images.

A further important advantage of the N-acyl-N-aryl hydrazines resides in the fact that they are much more stable than the aromatic hydrazines of U. S. P. 2,339,213, and may be prepared and handled with greater ease.

A further advantage in the use of the N-acyl-N-aryl hydrazines is found in the double function of certain of these compounds to act both as a developer and as an azo dye coupling component. In other words, the presence of the acyl group on the α-nitrogen atom allows the incorporation of groups capable of fission and recoupling with the hydrazine portion of the molecule to give an azo dye. The N-acyl-N-aryl hydrazines when used as color developers therefore involve a very marked improvement over the aromatic hydrazines of said patent when employed for the same purpose.

The term "aryl" as used herein and particularly in designating the "N-acyl-N-aryl hydrazines" is intended to mean an aromatic radical, i. e., an aromatic hydrocarbon radical or such a radical having substituent groups thereon.

Various modifications of the invention will occur to workers skilled in this art, and I therefore do not intend to be limited in the patent granted except as required by the appended claims.

I claim:

1. The process of producing azo dyestuff images in a photographic element which comprises developing a reducible silver salt image selected from the class consisting of reducible silver halide and silver ferrocyanide with an asymmetrical N-acyl-N-aryl hydrazine in which a terminal group is primary amino while reacting the oxidation products produced from said N-acyl-aryl-hydrazine by such development with a non-quinone-forming phenol as an azo dye coupling component to produce an azo dyestuff in situ with the resulting metal image.

2. The process as defined in claim 1 wherein said developable metal salt image is a silver ferrocyanide image.

3. The process of producing azo dyestuff images in a photographic emulsion containing a reducible silver salt image selected from the class consisting of reducible silver halide silver ferrocyanide images, and also containing a non-quinone-forming phenol, fast to diffusion, as a coupling component which comprises developing said developable image with an asymmetrical N-acyl-N-aryl hydrazine in which a terminal group is primary amino while reacting the oxidation products produced from said N-acyl-N-aryl hydrazine by such development with said coupling component to produce an azo dye in situ with the resulting metal image.

4. The process as defined in claim 3 wherein said reducible silver salt image is a latent silver halide image.

5. The process of producing positive azo dyestuff images in a photographic silver halide emulsion which comprises exposing the emulsion, developing the same in a black and white developer, re-exposing the residual silver halide and developing the residual silver halide with an asymmetrical N-acyl-naryl hydrazine in which a terminal group is primary amino while reacting the oxidation products produced from said N-acyl-N-aryl hydrazine by such development with a non-quinone-forming phenol as a coupling component to produce an azo dye in situ with the resulting silver image.

6. The process of producing azo dyestuff images in a photographic silver halide emulsion which comprises exposing the emulsion and developing the same with an asymmetrical N-acyl-N-aryl hydrazine in which a terminal group is primary amino and in which the acyl group contains, as a substituent, the radical of a non-quinone-forming naphthol compound capable of azo dye coupling whereby on reduction of the silver halide to form a silver image the N-acyl-N-aryl hydrazine is split to form two components which react to produce an azo dyestuff image in situ with the resulting silver image.

7. A photographic light sensitive silver halide emulsion containing as a color developer an asymmetrical N-acyl-N-aryl hydrazine in which a terminal group is selected from the class consisting of primary amino and amino substituted by an acid radical which is split off with regeneration of a primary amino group upon change in pH, and the salts of said hydrazine.

8. A photographic silver halide emulsion containing a non-quinone-forming phenol fast to diffusion as a coupling component and as a developer an asymmetrical N-acyl-N-aryl hydrazine having a terminal group selected from the class consisting of primary amino and amino substituted by an acid group which splits off with regeneration of a primary amino group upon change in pH and the salts of said hydrazine.

9. A photographic developer comprising an alkaline solution of a non-quinone forming phenol, as a coupling component, and an asymmetrical N-acyl-N-aryl hydrazine in which the terminal group is primary amino, said hydrazine acting as the active developing ingredient.

10. The process of producing dyestuff images in a silver halide emulsion which comprises exposing the emulsion and color developing the same with a solution containing R-salt and 2-phenyl semicarbazide.

11. The process of producing dyestuff images in a silver halide emulsion containing N-stearoyl-H-salt as a coupling component which comprises exposing the emulsion and color developing the same in a developer containing as the sole reducing agent bis-4.4'-diphenylene-2.2'-semicarbazide.

12. The process of producing dyestuff images in a silver halide emulsion containing 4-β-naphthyl-2-semicarbazide sulfate which comprises exposing the emulsion, and developing the same in an alkaline solution.

13. A gelatino-silver halide emulsion containing 4-β-naphthyl-2-phenyl semicarbazide sulfate.

14. A photographic color developer comprising an aqueous alkaline solution of R-salt and 2-phenyl semicarbazide.

15. A photographic color developer comprising an aqueous alkaline solution of bis-4.4'-diphenylene-2.2'-semicarbazide.

WILLIAM E. HANFORD.

REFERENCES CITED

The following references are of record in the file of this patent:

UNITED STATES PATENTS

| Number | Name | Date |
|---|---|---|
| 1,082,622 | Caldwell | Dec. 30, 1913 |
| 2,276,254 | Schinzel | Mar. 10, 1942 |
| 2,339,213 | Woodward et al. | Jan. 11, 1944 |

OTHER REFERENCES

Friedman, "American Photography," June 1937, p. 448 cited. (Copy in S. L.)